Aug. 26, 1924.  
C. H. WILLS  
BEARING LUBRICATION  
Filed Dec. 20, 1920
1,506,513
2 Sheets-Sheet 1
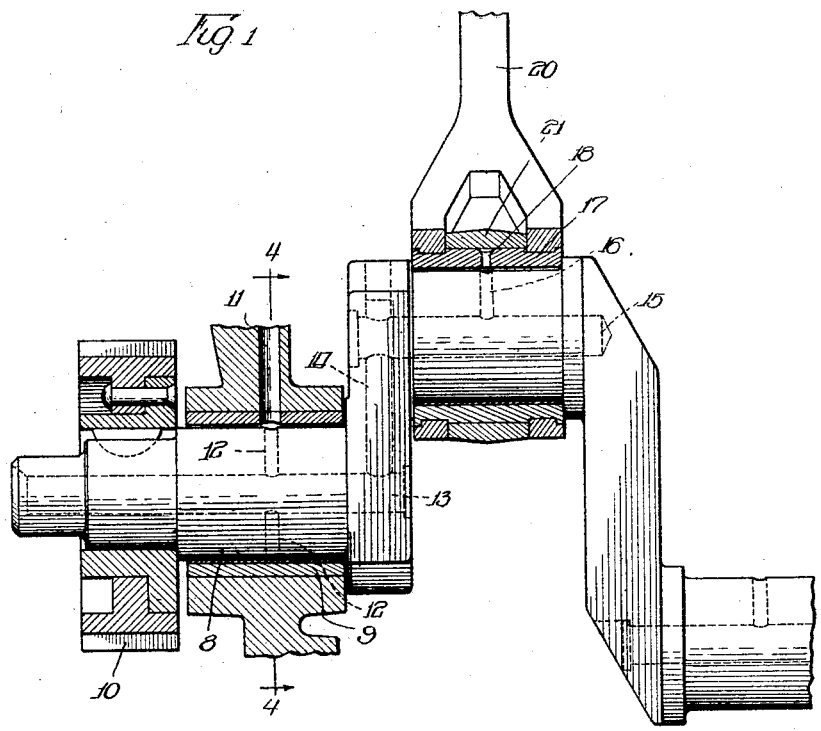
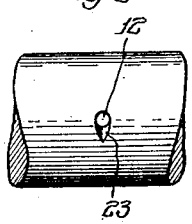
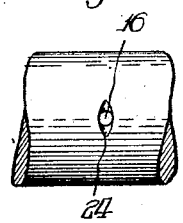
Witness:  
R. Burkhardt
Inventor:  
C. Harold Wills,  
By Wilkinson Huxley Byron & Knight  
Attys.

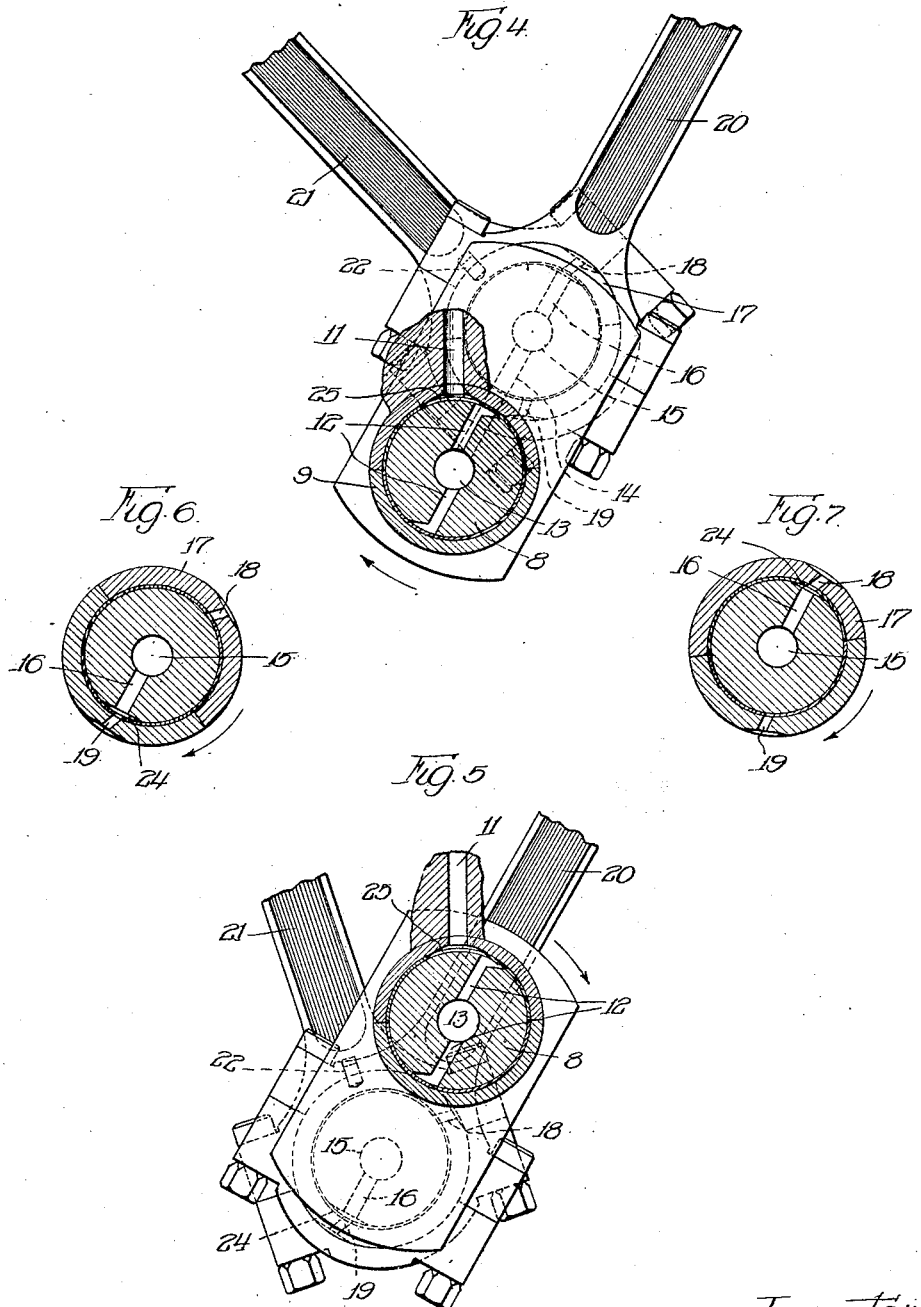

Patented Aug. 26, 1924.

1,506,513

UNITED STATES PATENT OFFICE.

CHILDE HAROLD WILLS, OF MARYSVILLE, MICHIGAN.

BEARING LUBRICATION.

Application filed December 20, 1920. Serial No. 431,806.

*To all whom it may concern:*

Be it known that I, CHILDE HAROLD WILLS, a citizen of the United States, residing at Marysville, in the county of St. Clair and State of Michigan, have invented certain new and useful Improvements in Bearing Lubrication, of which the following is a specification.

This invention relates to a new and improved method and means for lubricating a crank shaft, and more specifically for lubricating bearings of crank shafts of the type used in hydrocarbon motors.

The invention relates to more efficient means for transmitting oil to the crank shaft at the main crank shaft bearings and for transmitting oil from the crank shaft to the connecting rod bearings. It further comprises means especially adapted for use with motors of the V type having a plurality of connecting rods upon a single throw of the crank shaft.

In the lubricating systems including oil passages in the crank shaft, oil must be fed to the crank shaft under relatively heavy pressure, the oil entering the crank shaft at the bearings of the crank shaft in the crank case. The large pressure required is due to the fact that the oil must pass through radial passages into the rotating shaft and consequently must overcome centrifugal force, and due to the further fact that the oil enters the shaft during a small portion only of each revolution. The oil then commonly passes through an axial passage in the shaft and thence out through radial passages at the connecting rod bearings.

Where the connecting rod bears directly on the crank shaft the necessity for pressure to aid in the oil distribution at the connecting rod bearings is lessened, since the centrifugal force tends to urge the oil out of the radial crank shaft passages. However, in motors of the V type, it is customary to have two connecting rods bearing upon a single throw of the crank shaft and in such cases a bearing sleeve is provided keyed to one connecting rod and bearing upon the throw of the crank shaft. The other connecting rod bears upon the sleeve and has a rocking movement relative thereto. In such constructions it is essential to secure the passage of lubricant through the bearing sleeve to the bearing of the connecting rod fitting loosely thereon. The oil port in the crank shaft throw will only be in registration with any port in the bearing sleeve for a relatively small portion of the revolution of the shaft. It is therefore necessary to so design the sleeve port or ports as to secure maximum passage of oil during this short period. Since the loose connecting rod has only a limited rocking movement upon the bearing sleeve, it is highly desirable to lubricate this sleeve at a plurality of points.

In order that the oil may feed outwardly with the greatest possible efficiency through the ports in the bearing sleeve, the ports taking oil into the shaft should be in communication with the oil feed port at the same instant that the outlet ports in the shaft are in registration with the sleeve ports. Otherwise the oil in the shaft passages is not under pressure and only centrifugal force will be present to accomplish the outward oil feed. In high speed engines the period of registration between shaft and port ducts is so short that where the intervening passage is long the oil pressure may not reach the outlet ports from the intake ports until after intake registration has ceased. In such cases the intake ports will be given a lead over the outlet ports.

Where there are a plurality of outlet ports it is obvious that to secure the maximum efficiency there must be a similar number of properly related intake ports, not only to secure an adequate oil supply but also to secure oil pressure at the proper instants. Since the points of greatest bearing wear are the upper and lower points, the sleeve ports should be so arranged as to register with the shaft ports while at these points.

It is an object of the present invention to provide means whereby lubricant may be fed to a crank shaft at the crank case bearings; outwardly of a crank shaft at the connecting rod bearings, and through a sleeve at said bearings with a minimum oil pressure.

It is a further object to provide means whereby this lubrication may be maintained in sufficient volume with a low oil pressure with ports of the usual type, or whereby an increased flow of oil may be secured with the usual oil pressures.

It is also an object to provide oil distributing means so designed that sufficient lubrication may be afforded with oil ports of a minimum size, thereby causing a minimum weakening of the crank shaft.

It is a further object to provide intake oil ports so located as to minimize the effect of centrifugal force upon the incoming oil.

It is an additional object to provide oil outlet ports in bearings so designed as to utilize for oil distribution both the centrifugal and rotary force supplied to the oil.

Other and further objects will appear as the description proceeds.

More specifically, my invention involves the formation of lubricant intake passages in a rotating member located on a chord of the cross section thereof and extending rearwardly relative to the direction of rotation of the shaft.

The invention further includes the provision of a plurality of oil passages in a crank shaft bearing sleeve in such manner that the connecting rod bearing is lubricated at both the top and bottom of the piston stroke.

The invention further provides outlet oil passages formed upon a chord of the member and extending forwardly of the direction of rotation of the outwardly feeding oil.

I have illustrated a preferred embodiment of my invention in the accompanying drawings, in which—

Figure 1 is a fragmentary section showing a crank shaft and its associated bearings supplied with my invention;

Figure 2 is a fragmentary plan view showing the intake scupper;

Figure 3 is a fragmentary plan view showing the outlet scupper;

Figure 4 is a fragmentary view partly in section taken on line 4—4 of Figure 1, the right piston being at the lower limit of its movement;

Figure 5 is a view similar to Figure 4, taken with the right piston at its upper limit of movement;

Figure 6 is a section showing the relation of the shaft and sleeve ducts with the parts shown in the position of Figure 5; and Figure 7 is a view similar to Figure 6 showing the parts in the relation of Figure 4.

As shown in Figure 1, the shaft 8 is carried in the bearings 9 in the crank case. The forward end of the shaft as shown has keyed thereto the gear wheel 10. An oil passage 11 is provided extending through the crank case to the shaft bearing. The shaft is provided with a pair of non-radial oil inlet ducts 12, these ducts being located in the same plane as the passage 11 and communicating with the central oil channel 13 in the shaft. The oil channel 13 communicates with the radial passage 14 and the latter in turn with the axial passage 15 extending through a throw of the crank shaft. The radial duct 16 extends outwardly from the passage 15 to the bearing upon the crank throw.

The crank throw is surrounded by the bearing sleeve 17 provided with the non-radial ducts 18 and 19, the two connecting rods 20 and 21 and their lower ends encircling the sleeve 17. The lower end of the rod 20 is bifurcated, and the lower end of the rod 21 is interfitted between the bifurcated portion. The sleeve 17 is fixed relatively to the rod 20 by the stud 22. Each passage 12 is provided at its outer end with a semi-elliptic scupper 23, as shown in Figure 2. Each passage 16 is provided with a full elliptic scupper 25, as shown in Figures 4 and 5.

In the operation of my lubrication system, oil is applied through the port 11 under pressure and passes through the passages 12 of the crank shaft to the central passages 13. These passages 12, as best shown in Figures 4 and 5, are non-radial in direction, and, considered relatively to the direction of rotation of the shaft, are located rearwardly of the diameter parallel thereto. The semi-elliptic scuppers 23 extend forwardly of their respective channels and have their rear walls substantially coincident with the channel walls. This formation is particularly efficient in securing the passage of the oil from the channel 11 into the crank shaft. The forward extension of the scupper permits the oil to pass down and the rear wall of the passage serves to positively direct the lubricant down into the passage. Due to the non-radial direction of the passages, the outward tendency of the centrifugal force supplied to the oil by the rotation of the shaft is largely minimized.

The oil is carried from the passage 13 outward through the passage 14 to the passage 15 assisted by centrifugal force. It is similarly carried from the passage 15 to the crank throw bearing through the passage 16, its distribution upon the inner surface of the sleeve 17 being facilitated by the full elliptic scupper 24. The passages 18 and 19 which extend through the sleeve 17 extend forwardly of the direction of rotation of the shaft, as best shown in Figures 6 and 7. They greatly facilitate the passage of oil, since its passage is assisted not only by centrifugal force but also by the circumferential velocity imparted to the oil by the rotation of the shaft.

As shown in Figures 4 and 5, these ducts 18 and 19 are so located upon the sleeve 17 that each one of them lies upon the axis of the connecting rod 21 at the moment when the opening 16 is brought into alignment therewith. This construction therefore applies the lubricant to the connecting rod directly at the upper and lower points bearing upon the sleeve, which points are the points of most wear.

It will be understood that the oil feed in the shaft occurs as a series of pulsations due to the intermittent registration of the shaft intake and bearing ports. A perceptible period of time may be required for the pulsations to reach the outlet port and hence in the device as shown in Figures 4 and 5, the intake ports are given a lead over the outlet ports. The lead necessarily will vary in different engines with differing speeds and oil passage designs and lengths. Two intake ports are provided so that a pulsation will occur as the outlet port is aligned with each sleeve port.

In the use of parts designed in accordance with my invention, the connecting rod bearings may be lubricated by an oil system operating under a lower pressure than would be required were the passages of the usual radial types; or, if it is desired to operate under usual oil pressures, the passages may be decreased in size, thereby decreasing the amount of weakening of the parts due to placing the passages therein; or if oil pressure and the size of the ducts are maintained as usual, the flow of oil will be very much increased, with a consequent increase in the efficiency of the lubrication.

I claim:

1. A cylindrical member, means supporting the member adapted for relative rotary movement therebetween, a central opening in the member, and a plurality of oil channels upon chords of the cylinder extending from the central opening to the exterior of the member.

2. A bearing adapted to be associated with a rotating shaft, an oil duct in the shaft opening to the bearing, and an oil duct in the bearing adapted to coact with the shaft duct, the axis of the bearing duct being non-radial relative to the shaft.

3. A bearing adapted to be associated with a rotating shaft, an oil duct in the shaft opening to the bearing, and an oil duct in the bearing adapted to coact with the shaft duct, the axis of the bearing duct being upon a chord of the shaft.

4. A bearing adapted to be associated with a rotating shaft, an oil duct in the shaft opening to the bearing, and an oil duct in the bearing adapted to coact with the shaft duct, the axis of the bearing duct being directed forwardly relative to the direction of rotation of the shaft.

5. A bearing adapted to be associated with a rotating shaft, an oil feeding duct in the shaft, and a non-radial oil receiving duct in the bearing aligned with the shaft duct and adapted to receive oil therefrom.

6. In a hydrocarbon motor, a crank shaft having a plurality of connecting rods associated with a single throw thereof, a bearing between the shaft and rods, and oil ducts in the shaft and in the bearing, the oil duct in the bearing being non-radial.

7. In a hydrocarbon motor, a crank shaft having a plurality of connecting rods associated with a single throw thereof, a bearing between the shaft and rods, and oil ducts in the shaft and in the bearing, the oil duct in the bearing being directed forwardly relative to the direction of rotation of the shaft.

8. In a hydrocarbon motor, a crank shaft having a plurality of connecting rods associated with a single throw thereof, a bearing between the shaft and rods, an oil duct in the shaft, and a plurality of ducts in the bearing so located as to be successively substantially aligned with the shaft duct when one of said connecting rods is at the top and bottom of its stroke.

9. In a hydrocarbon motor, a crank shaft having a pair of connecting rods associated with a single throw thereof, a bearing between the shaft and rods, the bearing being keyed to one of said rods, and oil ducts in the shaft and through the bearing in alignment with the loose connecting rod.

10. In a hydrocarbon motor, a crank shaft having a pair of connecting rods associated with a single throw thereof, a bearing between the shaft and rods, the bearing being keyed to one of said rods, an oil duct in the shaft, and a plurality of ducts through the bearing so located as to be substantially aligned with the shaft duct when the loose connecting rod is at the top and bottom of its stroke.

11. In a hydrocarbon motor, a crank shaft having a pair of connecting rods associated with a single throw thereof, a bearing between the shaft and rods, the bearing being keyed to one of said rods, an oil duct in the shaft, and a plurality of ducts through the bearing so located as to be substantially aligned with the shaft duct when the loose connecting rod is at the top and bottom of its stroke, the bearing ducts being non-radial.

12. In a hydrocarbon motor, a crank shaft having a pair of connecting rods associated with a single throw thereof, a bearing between the shaft and rods, the bearing being keyed to one of said rods, an oil duct in the shaft, and a plurality of ducts through the bearing so located as to be substantially aligned with the shaft duct when the loose connecting rod is at the top and bottom of its stroke, the bearing ducts being located upon a chord of the shaft and being directed forwardly relative to the direction of rotation of the shaft.

13. In a hydrocarbon motor, a crank shaft having a plurality of connecting rods associated with a single throw thereof, a bearing between the shaft and rods, an oil duct in the shaft, a plurality of ducts in the bearing so located as to be successively substantially aligned with the shaft duct when one of said connecting rods is at the top and bottom of its stroke, and a plurality of intake ports in the shaft adapted to supply oil to the shaft duct as discharged therefrom to the bearing ducts.

14. In a hydrocarbon motor, a crank shaft having a pair of connecting rods associated with a single throw thereof, a bearing between the shaft and rods, the bearing being keyed to one of said rods, oil ducts in the shaft and through the bearing in alignment with the loose connecting rod, and a plurality of intake ports in the shaft adapted to supply oil to the shaft duct as discharged therefrom to the bearing ducts.

15. In a hydrocarbon motor, a crank shaft having a pair of connecting rods associated with a single throw thereof, a bearing between the shaft and rods, the bearing being keyed to one of said rods, an oil duct in the shaft, a plurality of ducts through the bearing so located as to be substantially aligned with the shaft duct when the loose connecting rod is at the top and bottom of its stroke, and a plurality of intake ports in the shaft adapted to supply oil to said duct in predetermined relation to the discharge of oil to the bearing ducts.

16. In a hydrocarbon motor, a crank shaft having a pair of connecting rods associated with a single throw thereof, a bearing between the shaft and rods, the bearing being keyed to one of said rods, an oil duct in the shaft, a plurality of ducts through the bearing so located as to be substantially aligned with the shaft duct when the loose connecting rod is at the top and bottom of its stroke, the bearing ducts being non-radial, and a plurality of non-radial intake ports in the shaft adapted to supply oil to said duct in predetermined relation to the discharge of oil to the bearing ducts.

Signed at Marysville, Michigan, this 8th day of December, 1920.

CHILDE HAROLD WILLS.